United States Patent [19]
Norris

[11] 3,960,456
[45] June 1, 1976

[54] INCIPIENT SHEAR PIN FAILURE INDICATING MEANS

[76] Inventor: Kenneth Edward Norris, Somerset, Colo. 81434

[22] Filed: Nov. 25, 1974

[21] Appl. No.: 527,126

[52] U.S. Cl. .................................. 403/27; 403/2; 116/114 Q; 33/178 B
[51] Int. Cl.² .................. B25G 3/00; F16D 1/00; F16G 11/00
[58] Field of Search .................. 403/2, 27; 33/178 B

[56] References Cited
UNITED STATES PATENTS

| | | |
|---|---|---|
| 2,518,229 | 8/1950 | Fox .................................. 33/178 B |
| 2,715,281 | 8/1955 | Black .............................. 33/178 B |
| 2,903,797 | 9/1959 | Porter ............................. 33/178 B |
| 3,105,401 | 10/1963 | Diamond ....................... 33/178 B |
| 3,157,417 | 11/1964 | Ruskin ................................ 403/2 |
| 3,425,724 | 2/1969 | Resener ............................. 403/27 |
| 3,430,460 | 3/1969 | Hankinson ....................... 64/28 R |

*Primary Examiner*—Wayne L. Shedd

[57] ABSTRACT

A shear pin is provided with a longitudinal hole such that any internal deformations caused by fatigue or over stressing of the shear pin may be detected by the condition of the surface within the hole therefore giving warning of failure of the shear pin before the shear pin fails.

1 Claim, 2 Drawing Figures

INCIPIENT SHEAR PIN FAILURE INDICATING MEANS

This invention relates to a shear pin which will indicate possible failure of the shear pin prior to the failure occurrence.

When a shear pin is used as a connecting device between linkages the pin is subjected to severe shear stress loading and to cyclic stress reversals which tend to fatigue and weaken the shear pin. Since a shear pin is designed to fail in shear with any force put upon the shear pin that is slightly greater than the force for which the shear pin is designed the stress in the shear pin material is much greater than that stress which would allow a long life of the shear pin. The problem of fatigue as well as wear of the shear pin increases the probability of pin failure before the expected life of the pin. On most equipment which use shear pins, including the wicket gate linkage of a hydraulic turbine, the failure of a shear pin necessitates a shutdown of the machine which is inconvenient and costly and may require the shutdown of an entire plant.

It is an object of this invention to provide a mechanism of failure detection for a shear pin prior to the failure to avoid excessive inconvenience and cost caused by a shutdown of the associated machinery.

Another object of this invention is to be inexpensive and easy to build requiring only common tools and methods to manufacture.

Yet another object of this invention is to provide a reliable and rugged means of failure detection whch allows detection to be made enough time prior to the failure that the pin may be replaced during a pre-scheduled outage, while keeping the device simple and easy to use and understand.

Another object of this invention is to be indicative of pending failure while in operation or shut down with only a moments time required by the inspector with no danger to the inspector.

Yet another object of this invention is to require no special maintenance or special operating expense.

Referring to the drawings.

Figure 2:
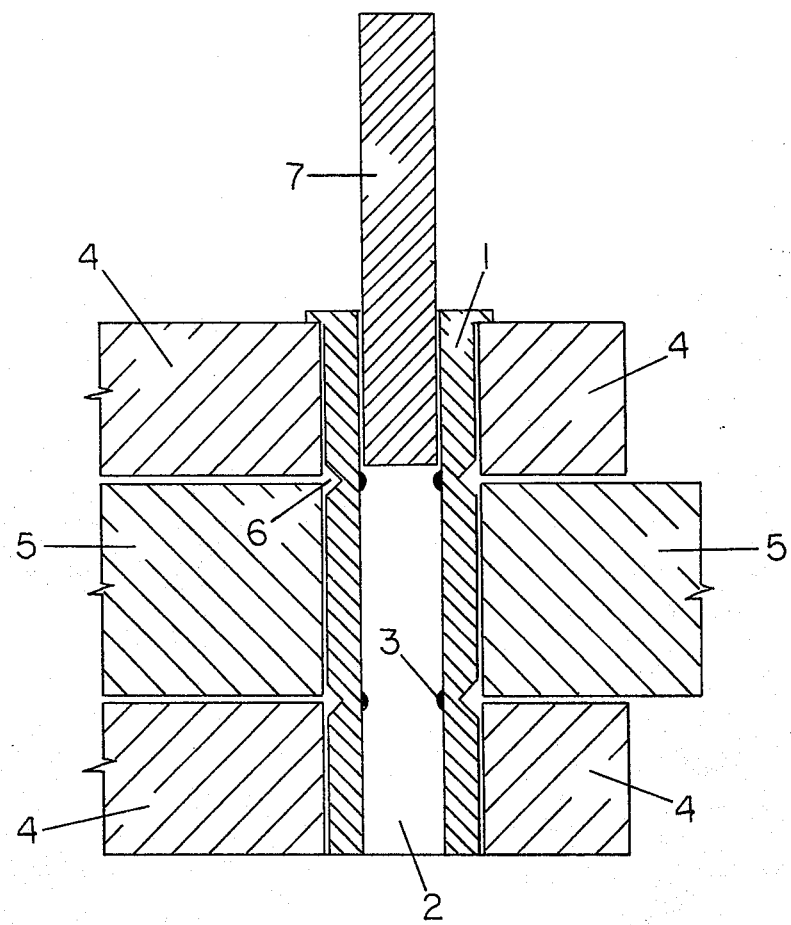
FIG. 2 is a cross sectional view taken on line 2—2 of FIG. 1.

Referring to the drawings and particularly to FIG. 2, it is apparent that with a shear pin 1 such as that utilized in a linkage 4 connecting mechanism the shear pin 1 is subjected to severe shear loadings which may cause the shear pin 1 to weaken and shear during loading with or without abnormal forces acting upon the shear pin 1. Before failure of the shear pin 1 permanent deformation of the interior surface 2 formed by the opening will become apparent indicating a danger of failure. The shear pin 1 may be checked routinely for these indications of weakening of the shear pin 1 material therefore allowing shear pin 1 replacement before failure.

Figure 1:
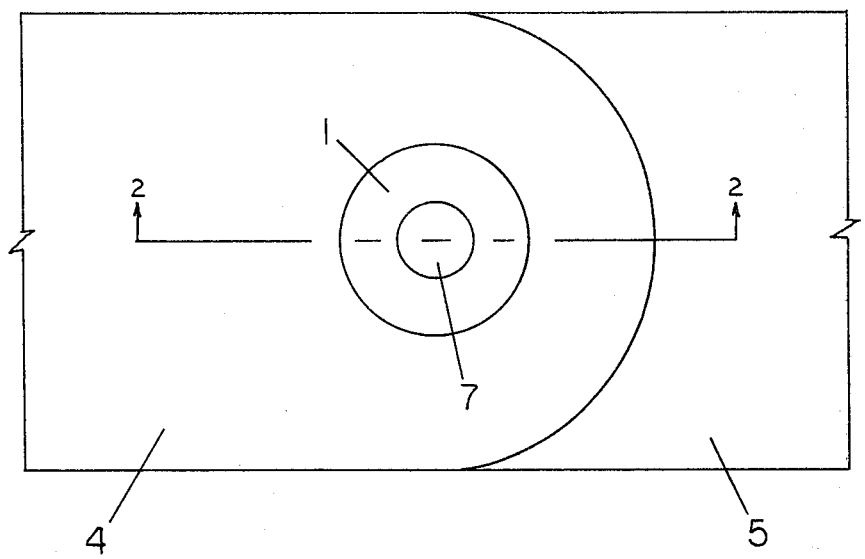
FIG. 1 is a plan view of the "Norris Shear Pin,"

This invention contemplates a particular design of a shear pin 1 and failure warning system and is concerned with the form shown in FIGS. 1 and 2.

Referring to FIG. 2, a force is transmitted from the driving linkage 4 to the shear pin 1, through the shear pin 1 to the driven linkage 5 where the shear pin 1 is the weakest force transmitting member in the linkage assembly. A shear notch 6 may but must not necessarily be provided in the shear pin 1 to provide a stress concentration and a reduction in cross sectional area to weaken the shear pin 1 thereby allowing the shear pin 1 to shear at a force less than that which would damage the associated linkage, thereby providing an expendable member in the linkage system. The driving linkage 4 and the driven linkage 5 may be associated with any mechanical system. This would include the wicket gate linkage on a hydraulic Francis Type turbine. The shear pin 1 may be any material, size, shape, or configuration compatible with the driving linkage 4 and the driven linkage 5.

At the points in the shear pin 1 where the forces from the driving linkage 4 and the driven linkage 5 are in different directions a weakening of the shear pin 1 material will occur. If a shear notch 6 is provided at this location in the shear pin 1 the stress concentration as well as the reduction in cross sectional area will facilitate over stressing of this area as well as fatigue. Where the weakening of the shear pin 1 material occurs over a period of time a plastic deformation will become apparent before failure of the shear pin 1. Where the weakening of the shear pin 1 occurs by an instantaneous over stressing a plastic deformation may occur without breakage of the shear pin 1. To have access to the interior surface 2 of the shear pin 1 for detection of the plastic deformation an opening is provided in the shear pin 1. The size, shape, or configuration of the opening is not important as long as the opening gives access to the interior surface 2 of the shear pin 1. The opening may be made in any shear pin 1 by any means including drilling, boring, moulding, or cutting. The opening must be provided in the shear pin 1 before the shear pin 1 is plastically deformed to allow the deformation to be detected. The opening may have different sizes in different sections of the shear pin 1 and may or may not extend all the way through the shear pin 1.

The surface 2 of the interior opening inside the shear pin 1 will when plastically deformed due to weakening exhibit a blemish 3 in the region of the weakening. This blemish 3 may be detected by any means including but not restricted to any touch sensitive member including a human finger, any light sensitive or visual device, any gaging member 7, or any other means of detection. Any of these means of detection may be used on the shear pin 1 while the linkage is in operation or shut down. If a gaging member 7 is used for deformation detection the gaging member 7 must be of a size such that it may be inserted into the hole past the areas subjected to the maximum shear when no deformation is present. When the interior opening surface 2 in the shear pin 1 is deformed due to weakening the gaging member 7 will not pass the area of maximum shear thereby indicating a weakened shear pin 1.

The opening in the shear pin 1 may be through the complete length of the shear pin 1 or may be only part of the way through. Different sizes of openings in different sections of the shear pin 1 may be used or any combination of openings and detection mechanisms may be used to give the desired indication. Access to the interior surface 2 of the shear pin 1 for detection may be made from either end of the shear pin 1.

The detection mechanisms would ordinarily be used in the shear pin 1 for inspection and removed during operation of the shear pin 1 although if a coating was applied to the interior of the shear pin 1 to make plastic deformation easier to detect the coating would probably be left on during operation. Any coating could be used on the interior surface 2 of the shear pin 1 which would indicate an overstressed condition. The coating could give warning by crumbling in the overstressed area, by color change, or by any other property of the coating which would give the desired indication. The coating could be applied to the interior of the shear pin 1 by any means.

What is claimed is:

1. A shear pin pending failure detection means comprising in combination a hollow, permanently deformable shear pin and a plug gauge gauging member which is slidably receivable in said hollow shear pin, said shear pin having a smooth, cylindrical bore of a substantially constant, predetermined, first diameter extending coaxially therethrough; said plug gauge being cylindrical and having a second predetermined diameter which is slightly less than said first predetermined diameter, said gauge being receivable through said bore with a slip fit when said shear pin is undeformed; and an at least partially circumferential internal deformation on the internal surface of said shear pin which decreases the effective diameter of said bore within said shear pin, whereby full insertion of said gauge through said shear pin is prevented and possible incipient failure of said shear pin is indicated.

* * * * *